Patented Mar. 31, 1925.

1,531,763

UNITED STATES PATENT OFFICE.

JAMES H. STEDMAN, OF BRAINTREE, MASSACHUSETTS.

RUBBER FLOORING AND PROCESS OF MAKING THE SAME.

No Drawing.   Application filed September 13, 1921.  Serial No. 500,359.

*To all whom it may concern:*

Be it known that I, JAMES H. STEDMAN, a citizen of the United States, residing at Braintree, in the county of Norfolk and State of Massachusetts, have invented certain new and useful Improvements in Rubber Flooring and Processes of Making the Same; and I do hereby declare the following to be a full, clear, and exact description of the invention, such as will enable others skilled in the art to which it appertains to make and use the same.

This invention relates to a novel process of making a sheet rubber compound, which may be used for various purposes but which is particularly useful in the form of tiles for flooring, and to the article produced by practising the process.

Heretofore rubber sheets have been prepared for use as flooring or for other purposes, with a surface, produced by mixing in colored rubber, which is intended to simulate the graining on wood or the texture of the well-known Paisley shawl, for example as by the process described in the expired United States patent to Joseph Beck, No. 90,335, dated May 25, 1869. In such sheeting the colored rubber is mixed or moulded into a homogeneous sheet by being passed through heated calendering rolls which, because of their rolling pressure, cause the streaks of colored rubber to show on the surface in generally parallel lines, or striated form, extending in the direction of feed, or longitudinally of the sheet as it is delivered from the calender.

The object of the present invention is to produce a mottled surface on rubber sheeting in imitation of various kinds of marble or generally similar crystalline rock. Accordingly a feature of the invention consists in a novel mode of obtaining a mottled surface in which the commingled streaks of colored rubber, as they show on the surface, are not parallel but run in various directions relative to each other, in close approximation of the variegated irregular veins and pencilings found in crystalline rock.

The nature of the novel method will be indicated, for illustrative purposes, by a description of its practice in manufacturing flooring, and the true scope of the invention will then be particularly pointed out in the appended claims.

In practising the process for the purpose of making flooring crude rubber or reclaimed rubber is compounded with pigments. A plurality of such batches are compounded, each of a different color, by formula. In one process of manufacture each batch is fed first to a mixer or refining mill which kneads the mass together and delivers it in sheet or plastic form which, after first being combined with other refined batches of a different color, is later calendered. In another process of making the flooring the combining of the colors may be attained at the calender itself.

If done at the mixing mill the base color stock is first placed on the mill and thoroughly warmed. To this is added, warmed on another mill, whatever color stocks are desirable for the particular flooring in hand. These are thrown into the mill and allowed to run about the rolls two or three times. The mixed material is then removed and run through the calender with a "bank" at the feed side, which delivers the product in a smooth sheet of even thickness. The result of the mill mixing process is a stock showing veinings of the colored rubbers depending in size and distinctness upon the amount of material blended and the length of time left in the mixing mill.

The second method of blending is by introducing to the calender rolls the base color material, allowing the same to pass completely around the lower roll and become soft and plastic. To this is added strips of vari-colored stocks placed either laterally or longitudinally on the face of the rubber on the lower roll and allowed to follow the roll for two or three revolutions. The material then is run out in a strip about two feet wide onto a mandrel, or straight on a table, and then cut into pieces approximately three feet in length which are then cured separately.

From the calender the material comes with a mottled or a veined surface, smooth and closely compact. The effect obtained from the mill mixing and calendering is more like the veining of marble, while that of the calendering alone more closely resembles the well-known Paisley shawl or the graining of quartered oak, although the streaks of colored rubber are all drawn out in generally parallel lines. The blending of variegated colored rubber to produce a mottled surface is not claimed as new to the art in so far as has already been described.

The effect heretofore described presents a very attractive surface for flooring tile, but I have discovered that a still more attractive mottled surface can be produced by continuing the process of manufacture a step further, before curing. This novel surface I call a "cross-mottle." I have discovered that if the veins or streaks of the colored rubber are dragged or twisted out of their generally striated or parallel relation a surface is produced which has the attributes and appearance of the fine irregular veins and pencilings found in the finer marbles and similar crystalline rock. In order to gain this surface effect I take each short length that has been cut from the strip delivered from the calender and pass it again through the calendering rolls, but being careful to first turn each short length in its own plane at an angle to its original direction of movement when fed through the calender. It should be remembered that during the mill-mixing process, as well as the calendering, the rubber is developing a definite longitudinal grain or fibre the formation of which is materially aided by utilizing tire friction scrap or the like as a portion of the raw material, or by adding cotton fibre to the stock. This longitudinal fibre is present to a material degree even though there is no addition of cotton to the stock to aid its development, so that after the milling or calendering or both the sheets will have a definite greater tensile strength one way than the other. The tendency and effect of the second rolling pressure at an angle to the original rolling pressure, as described above, is to drag the fibre of the rubber, and the cotton fibre therein if present, from its lateral position into a position parallel to the path of movement of the piece through the rolls. This partially twists the fibre heretofore developed and the surface markings, causing said markings to turn laterally and run in various directions in the plane of the sheet, and the colors to blend in a manner to produce a very attractive cross-mottle in sheet, which is difficult to describe, but which might somewhat aptly be termed a gnarled surface. The particular angle through which each short length or piece is turned in recalendering is preferably ninety degrees presenting the side of the piece to the rolls instead of an end, since then the piece is only thinned and not changed from its rectangular form by recalendering. The pieces may be passed through the calendering rolls, in the new direction, more than once if desired but an extremely fine approximation of marble is obtained on a single passage therethrough, and also the thickness of the final sheet must be considered, it being understood as those skilled in the art are aware, that the rolls must be set slightly closer together at each new passage. The most attractive appearance has been obtained by turning the small sheets through a ninety degree angle and then passing them edgewise through the calendering rolls not more than twice. After having been recalendered and backed to the desired thickness the pieces are deposited in vulcanizing moulds and cured in the usual way.

I believe that I am the first to provide sheet rubber with a surface of the character indicated comprising a base color mottled with other colors which are so blended that the areas have no definite outline and the fibres of which run in various directions. Those skilled in the art will readily recognize that the present novel process of preparing rubber tiles and other articles, affords an organized method of manufacture which is simple, enables the articles to be prepared with great economy, and produces a sheet form of rubber having a distinctly different surface from any heretofore manufactured.

In the appended claims the term "colored rubber" should be understood as including not only colors contrasting with the color or tone of the mass of crude or reclaimed rubber, but also white or black. In practising the invention very beautiful effects have been obtained from the use of black or white rubber as a color, or a mixture of them with or without other colored rubber.

The nature and scope of the present invention having been indicated and the preferred manner of practising the method having been specifically described, what is claimed as new is:—

1. The method of making variegated rubber sheets having a cross-mottled surface which comprises compounding crude or reclaimed rubber with pigment, mixing a plurality of such stocks of colored rubber and calendering said mass into a sheet, and then recalendering said flat sheet by passing it edgewise through the calender with a direction of movement at an angle to the direction of the fibre of the sheet which was developed by the mixing and first calendering.

2. The method of making variegated rubber sheets having a cross-mottled surface which comprises compounding crude or reclaimed rubber with pigment, mixing a plurality of such stocks of colored rubber and calendering said mass into a sheet, and then turning said flat sheet in its own plane through an angle of ninety degrees and passing it again through the calender.

3. The method of making variegated rubber sheets having a cross-mottled surface which comprises compounding crude or reclaimed rubber with pigment, mixing a plurality of such stocks of colored rubber and calendering said mass into a sheet of indefinite length, cutting said sheet into short lengths, and recalendering each short length by passing it edgewise through the calender, side first.

4. The method of making variegated rubber sheets having a mottled surface which comprises forming a mass of rubber containing a plurality of colors, forming a sheet from said mass in which the streaks of coloring show on the surface in generally parallel lines, and then manipulating the grain or fibre thus formed to twist said streaks in various directions in the plane of the flat sheet and blend the surface colors into figures of indefinite outline.

5. As an article of manufacture a variegated, vulcanized rubber flooring tile, or the like, comprising a mixture of colored rubber stocks having the grain or fibres thereof twisted in their own plane out of their original position in parallel lines, whereby the variegated surface coloring presents a gnarled appearance.

6. The method of making variegated rubber sheets which comprises compounding crude or reclaimed rubber with cotton fibre and pigments, calendering said mass to draw the cotton fibre longitudinally of the sheet thus formed, and then recalendering the sheet one or more times, the direction of movement of the flat sheet, when recalendering, being across the line of direction into which the cotton fibre is forced by the first calendering.

7. The method of making variegated rubber sheets which comprises mixing crude or reclaimed rubber with pigments, the mixing process acting to produce a grain or fibre in the rubber which is drawn into generally parallel streaks longitudinally of the mass thus formed, calendering said mass to produce a sheet of the desired thickness having like characteristics and streaked or veined surface markings, and then recalendering the flat sheet in a manner to twist the fibre and streaks in the plane of the sheet and blend the streaks into a gnarled mass.

8. As an article of manufacture a variegated, vulcanized rubber flooring tile, or the like, consisting of a plurality of rubber color compounds the grain of which is reinforced by cotton fibre, and having the cotton fibres all partially turned from their original direction laterally of the sheet and in the plane thereof, whereby the grain is also turned in a like lateral direction and the vari-colored surface markings present a gnarled appearance.

JAMES H. STEDMAN.